United States Patent
Remillard et al.

(10) Patent No.: US 7,024,292 B2
(45) Date of Patent: Apr. 4, 2006

(54) ACTIVE NIGHT VISION CONTROL SYSTEM

(75) Inventors: Jeffrey T. Remillard, Ypsilanti, MI (US); Michael A. Marinelli, Northville, MI (US)

(73) Assignees: Ford Motor Company, Dearborn, MI (US); Lear Corporation, Southfield, MI (US)

( * ) Notice: Subject to any disclaimer, the term of this patent is extended or adjusted under 35 U.S.C. 154(b) by 0 days.

(21) Appl. No.: 10/604,931

(22) Filed: Aug. 27, 2003

(65) Prior Publication Data

US 2005/0065683 A1 Mar. 24, 2005

(51) Int. Cl.
*G06F 7/00* (2006.01)

(52) U.S. Cl. ........................................................ 701/36
(58) Field of Classification Search .................... 701/36, 701/96, 301; 180/169; 348/148, 118; 250/341.8
See application file for complete search history.

(56) References Cited

U.S. PATENT DOCUMENTS

| 6,420,704 B1 | * | 7/2002 | Berenz et al. .............. 250/330 |
| 6,429,429 B1 | * | 8/2002 | Fohl et al. .................. 250/353 |
| 2002/0003571 A1 | * | 1/2002 | Schofield et al. .......... 348/148 |

* cited by examiner

*Primary Examiner*—Michael J. Zanelli
(74) *Attorney, Agent, or Firm*—Frank MacKenzie; Earl LaFontaine

(57) ABSTRACT

A vision system (10) for a vehicle (14) includes a light source (46) that generates an illumination beam (20). A receiver (92) generates an image signal in response to a reflected portion of the illumination beam (20). A transmission sensor (120) generates a transmission signal. A controller (50) is coupled to the light source (46), the receiver (92), and the transmission sensor (120) and enables activation of the light source (46) in response to the transmission signal.

20 Claims, 5 Drawing Sheets

ACTIVE NIGHT VISION CONTROL SYSTEM

BACKGROUND OF INVENTION

The present invention relates to night vision systems, and more particularly, to a system and method of controlling operation of an active night vision system.

Night vision systems allow a vehicle occupant to better see objects during relatively low visible light level conditions, such as at nighttime. Night vision systems typically are classified as either passive night vision systems or active night vision systems. Passive systems simply detect ambient infrared light emitted from the objects within a particular environment. Active systems utilize a light source to illuminate a target area and subsequently detect the infrared light reflected off objects within that area.

Passive systems typically use far-infrared cameras that are characterized by low resolution and a relatively narrow field-of-view. Such cameras must be located on the vehicle exterior in order to acquire requisite infrared energy in the operating environment. Externally mounted cameras can negatively affect vehicle styling. Far-infrared cameras are also costly to manufacture and generate images that have poor contrast, which can be difficult to interpret.

Active systems provide improved resolution and image clarity over passive systems. Active systems utilize laser or incandescent light sources to generate an illumination beam having near infrared light energy, and charged coupled devices or CMOS cameras to detect the reflected infrared light. Active systems commonly deploy a light source external to the vehicle to transmit a significant amount of light energy and provide a bright scene for imaging.

Diode lasers are preferred over incandescent light sources for several reasons. Incandescent light sources are not monochromatic like diode lasers, but instead emit energy across a large spectrum, which must be filtered to prevent glare onto oncoming vehicles. Filtering a significant portion of the energy generated from a bulb is expensive, energy inefficient, and generates undesired thermal energy. Also, filter positioning is limited in incandescent applications, since the filter must be located proximate an associated light source. As well, multiple incandescent sources are often required to provide requisite illumination, thus increasing complexity and costs.

Although diode lasers are preferred over incandescent light sources, their emission wavelength is dependent on temperature, such that the output wavelength of a diode laser shifts approximately 0.25 nm for every one-degree Celsius change in temperature. The temperature sensitivity is especially evident when the laser diodes are externally mounted on a vehicle, since external temperatures vary considerably.

There is a current desire to utilize laser based active night vision systems within automotive vehicles. This utilization is limited by current and upcoming operating safety standards of laser products. These standards include acceptable operating levels of illumination, laser intensity levels, maximum permissible exposures, accessible emission limits, illumination distances and height requirements, as well as other known standards and requirements. Examples of laser product operating safety standards can be found in the European and international laser safety standard IEC 60825-1 from the International Electrotechnical Commission.

Thus, there exists a need for an improved system and method of controlling operation of a laser based active night vision system that satisfies safety-operating standards of interest and maintains a desired wavelength operating range of a light source of the night vision system.

SUMMARY OF INVENTION

The present invention provides a vision system for a vehicle. The vision system includes a light source that generates an illumination beam. A receiver generates an image signal in response to a reflected portion of the illumination beam. A transmission sensor generates a transmission signal. A controller is coupled to the light source, the receiver, and the transmission sensor and enables activation of the light source in response to the transmission signal.

The embodiments of the present invention provide several advantages. One such advantage that is provided by several embodiments of the present invention is the provision of a vision system having a variably controlled light source. The emission intensity of the light source is varied in response to the transmission gear and may be varied in response to other various vehicle and vision system related parameters. In so doing, the stated embodiments of the present invention are capable of operating a night vision system within a vehicle while satisfying various vision system safety operating standards.

Another advantage that is provided by multiple embodiments of the present invention is the provision of a thermal control system that maintains a desired operating range of the light source. In so doing, the present invention accurately maintains desired illumination wavelength of the light source and increases reliability of the light source.

Furthermore, another advantage that is provided by multiple embodiments of the present invention is the provision of a vision system that is able to preheat a light source before operation thereof. The stated embodiments may remotely enable heating of the light source. In so doing, the stated embodiments allow a vehicle operator to preheat the light source such that the night vision system can be activated and operated appropriately upon activation of the ignition system of the vehicle.

The present invention itself, together with further objects and attendant advantages, will be best understood by reference to the following detailed description, taken in conjunction with the accompanying drawing.

BRIEF DESCRIPTION OF DRAWINGS

For a more complete understanding of this invention reference should now be had to the embodiments illustrated in greater detail in the accompanying figures and described below by way of examples of the invention wherein.

DETAILED DESCRIPTION

Figure 1:
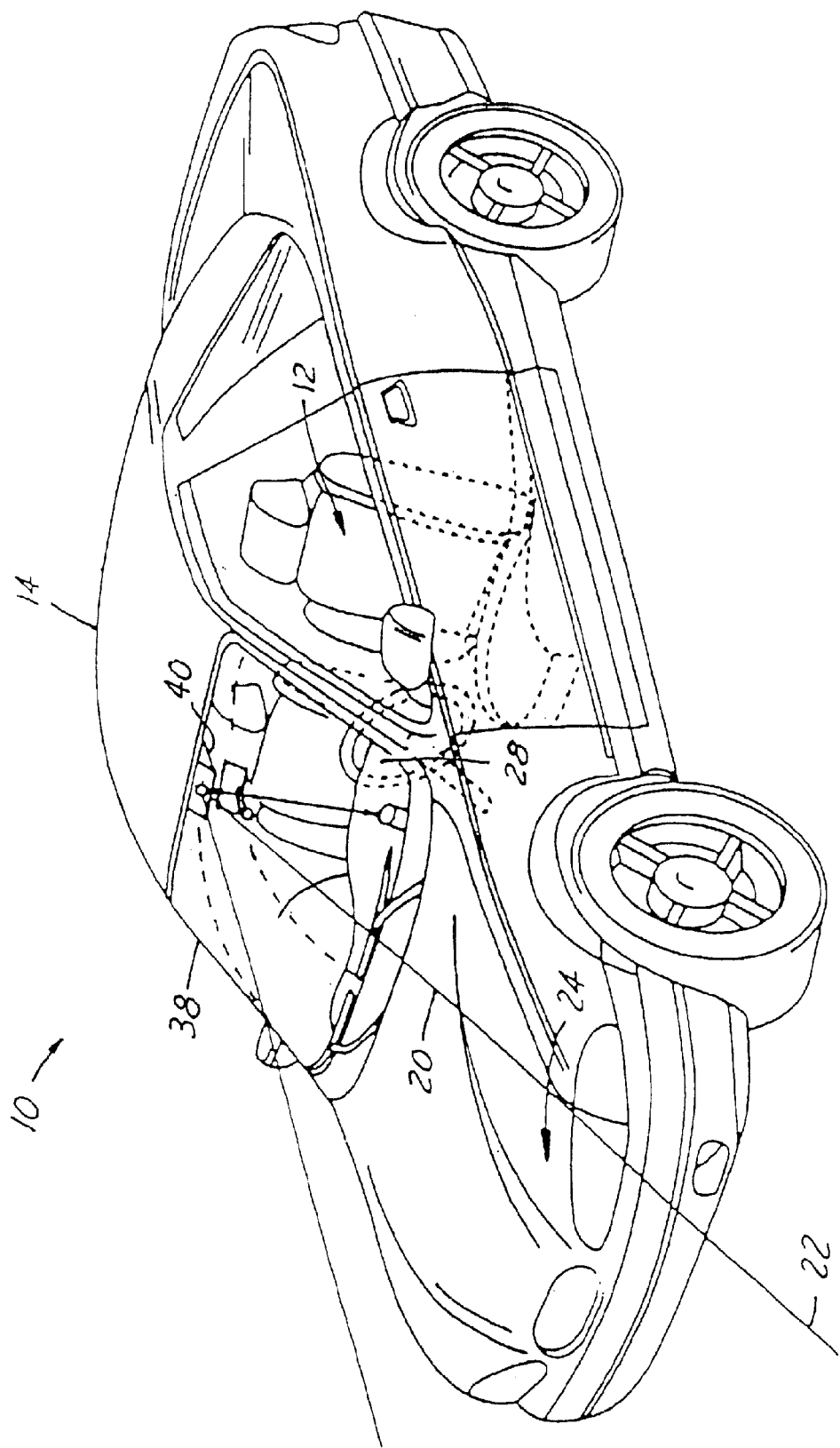
FIG. 1 is a front perspective view of an active night vision system in accordance with an embodiment of the present invention.

In the following figures the same reference numerals will be used to refer to the same components. While the present invention is described with respect to a system and method of controlling operation of an active night vision system, the present invention may be applied in various applications where near infrared imaging is desired, such as in adaptive cruise control applications, collision avoidance and countermeasure systems, and in image processing systems. The present invention may be applied during daytime hours or at night. The present invention may be applied in various types and styles of vehicles as well as in non-vehicle applications.

Also, although the present invention is described with respect an illumination system that is configured to be mounted within an overhead console of a vehicle, the present invention may be applied to light sources within or exterior to an interior cabin of a vehicle, as well as to other light sources.

In the following description, various operating parameters and components are described for one constructed embodiment. These specific parameters and components are included as examples and are not meant to be limiting.

Additionally, in the following description the term "near infrared light" refers to light having wavelengths within the infrared light spectrum (750 nm to 1000 nm) and light having wavelengths near or just outside of the infrared light spectrum. The term also at least includes the spectrum of light output by the particular laser diode source disclosed herein.

Figure 2:
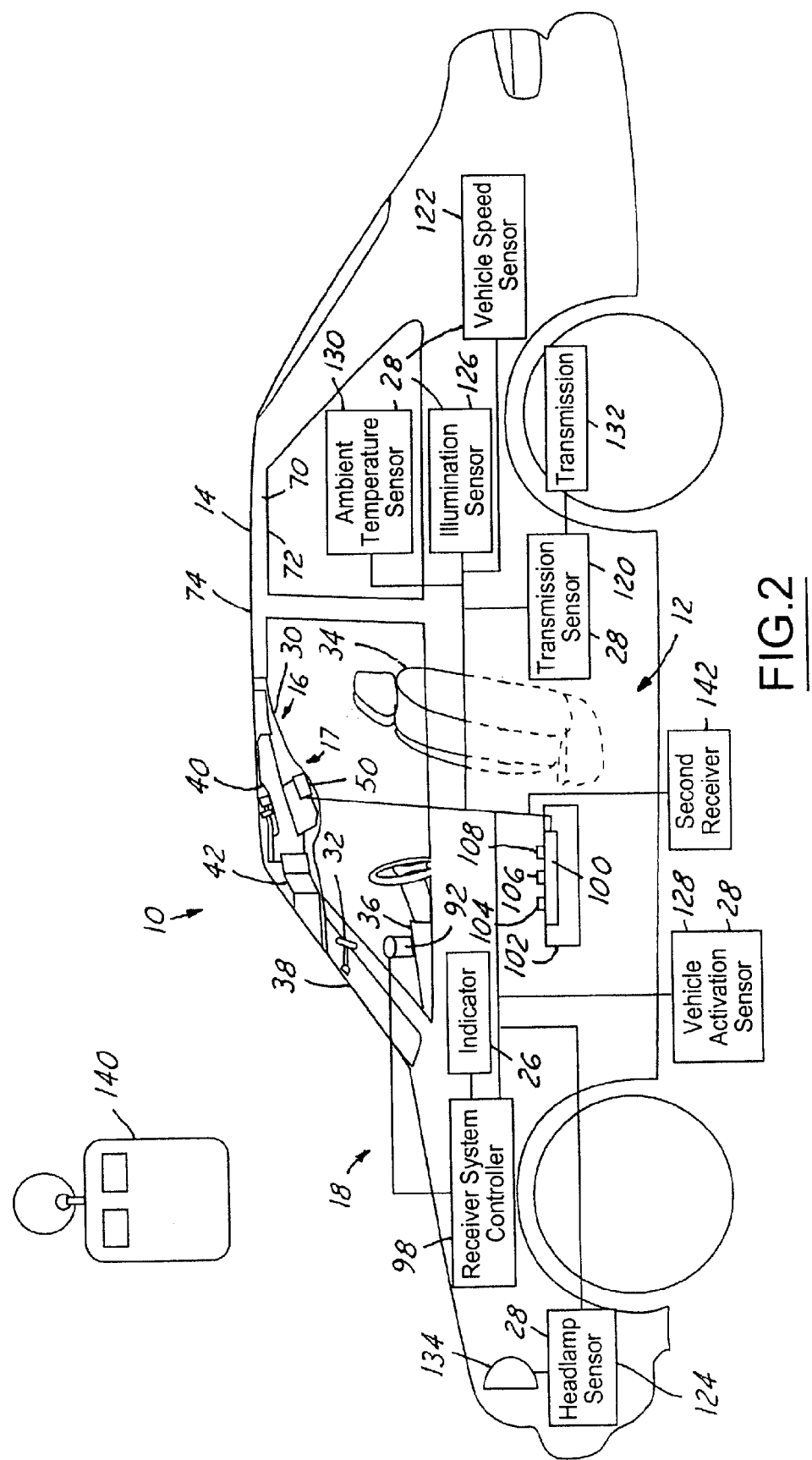
FIG. 2 is a side perspective and block diagrammatic view of the active night vision system in accordance with an embodiment of the present invention.

Referring now to FIGS. 1 and 2, front and side perspective views of an active night vision system 10 in accordance with an embodiment of the present invention are shown. The vision system 10 is configured for an interior passenger cabin 12 of a vehicle 14. The vision system 10 includes an illumination system 16 having a thermal control system 17, and a receiver system 18. The illumination system 16 generates an illumination beam 20 having a beam pattern 22, which is directed towards a target area 24 that is forward of the vehicle 10. Portions of the illumination beam 20 are reflected off objects (not shown) within the target area 24 and are received by the receiver system 18. The receiver system 18 indicates to vehicle occupants, via an indicator 26, detection of the objects in response to reflected portions of the illumination beam 20. The thermal control system 17 thermally controls the operating range of the illumination system 16.

Activation of the illumination system 16 and the receiver system 18 are enabled and disabled in response to various vehicle and vision system parameters. Some of the vehicle and vision system parameters are determined from the vision system operating sensors 28, which are described in further detail below.

The illumination system 16 is configured to be mounted within an overhead console 30 above a rearview mirror 32, and the receiver system 18 is configured to be mounted forward of a driver seat 34 on a dashboard 36. Of course, the illumination system 16 and the receiver system 18 may be mounted in other locations around the windshield 38 as well as other window and non-window locations within the vehicle 14.

Figure 3:
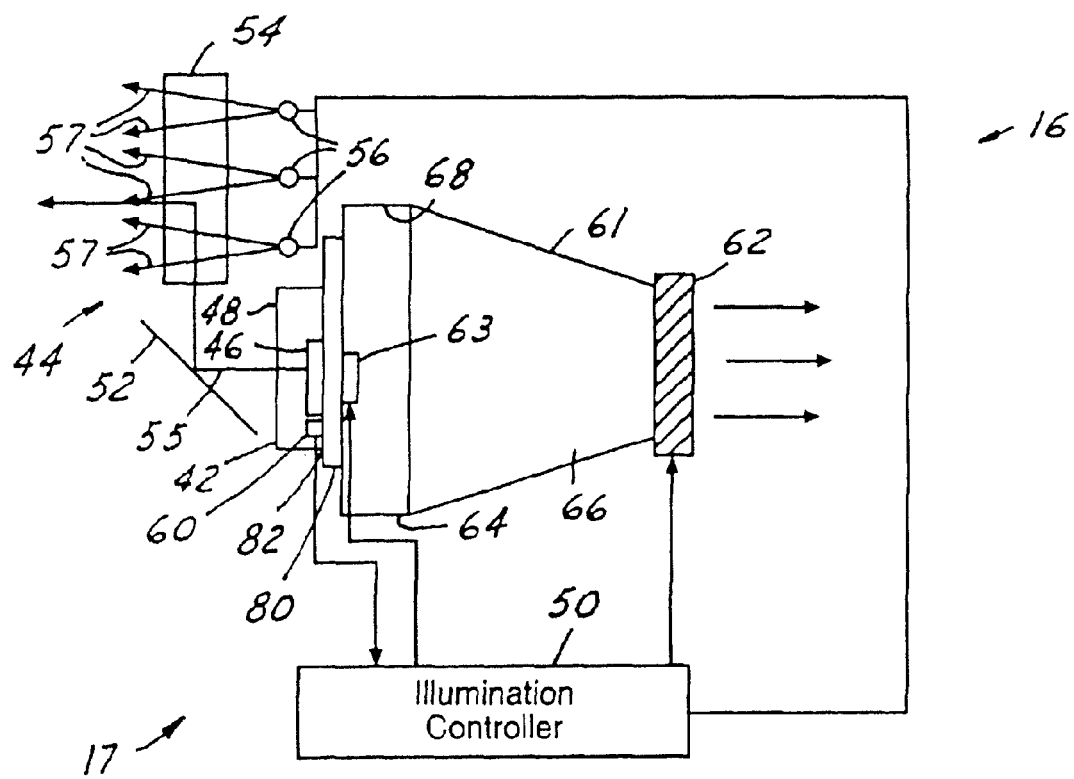
FIG. 3 is a block diagrammatic view of an illuminator system utilizing a thermal control system in accordance with an embodiment of the present invention.

Referring also to FIG. 3, a block diagrammatic view of the illuminator system 16 utilizing the thermal control system 17 in accordance with an embodiment of the present invention is shown. The illumination system 16 includes an illuminator assembly 40 and the thermal control system 17.

The illuminator assembly 40 includes a light source assembly 42 that generates light, which may be emitted from the assembly 42 in the form of an illumination beam, such as beam 20. Light generated from the light assembly 42 is directed through an optic assembly 44 where it is collimated to generate the illumination pattern 22. The illumination beam 20 is emitted from the light assembly 42 and passed through the windshield 38. The light assembly 42 includes a light source 46 that is contained within a light source housing 48. The light source 46 also receives an illumination signal from the illumination controller 50. The intensity of the illumination beam 20 is directly proportional to the voltage of the illumination signal. The illumination signal is converted into a current level that is supplied to the light source 46.

The light source 46 may be of various types and styles. In one embodiment of the present invention, the light source 46 is a near infrared diode laser that has desired monochromatic and illumination characteristics. The diode laser may, for example, be a Single Stripe Diode Laser, Model No. S-81-3000-C-200-H manufactured by Coherent, Inc. of Santa Clara, Calif.

The optical system 44 includes the light assembly 42, the light coupler 52, and the beam-forming optic 54. Light from the light source 46, represented by arrow 55, is emitted towards and is reflected by the light coupler 52 to the optic 54, where it is again reflected towards and through the windshield 38. The light coupler 52 and the optic 54 may be contained within a component alignment maintaining module or housing (not shown). The optical system 44 may also include a series of light emitting diodes (LEDs) 56 or the like for performing color mitigation and for adjusting perceived color of the illumination beam 20 as it is emitted from the illuminator assembly 16. The light emitted by the LEDs 56 is represented by the arrows 57.

The light coupler 52 may be in the form of a mirror, as shown, a series of mirrors, a fiber optic cable, or other reflective or light transporting device known in the art. In the embodiment as described, light is emitted from the light source 46 in the form of an elliptically shaped beam with a spread angle of approximately 20–50°. The beam is reflected at approximately a 90° angle by the light coupler 52 to enter the optic 54. Although the present invention is described with respect to the incorporated use of a light coupler 52, the present invention may be modified to have direct emission of light between the light source 46 and the optic 54, without use of a light coupler 52.

Although the optic 54 may be in the form of a thin sheet optical element, it may also be in some other form. Continuing from the above-described embodiment, the optic 54 expands and reflects the light generated by the light source 46 at approximately a 90° angle to direct the light forward of the vehicle 14. Light from the light source 46 enters and is reflected and/or collimated by the optic 54, and is then reflected and emitted through the windshield 38. Also, although a single optic is shown, additional optics may be incorporated within the illumination system 16 to form a desired beam pattern onto a target external from the vehicle 14.

The optic 54 may be formed of plastic, acrylic, or of some other similar material known in the art. The optic 54 can utilize the principle of total internal reflection (TIR) and form the desired beam pattern with a series of stepped facets (not shown); An example of a suitable optical element is disclosed in U.S. Pat. No. 6,422,713 entitled "Thin-Sheet Collimation Optics For Diode Laser Illumination Systems For Use In Night-Vision And Exterior Lighting Applications."

The thermal control system 17 includes the thermal sensor 60, the cooling assembly 61 that has a cooling device 62, the heater 63, and the controller 50. The cooling device 62 and the heater 63 perform in operative response to the thermal sensor 60, via the controller 50, as is described in further detail below. The cooling device 62 aids in transferring thermal energy away from the light source 46. The heater 63 provides and transfers thermal energy into the light source 46. The cooling device 62 and the heater 63 operate to maintain temperature of the light source 46 within a predetermined temperature range. For example, a diode laser may have a desired temperature operating range of approximately 35°–55° C., where 35° C. may be considered a maximum temperature limit and 55° C. may be considered a minimum temperature limit. These limits may vary as is further described in more detail below.

The thermal control system 17 also includes a heat sink 64. The heat sink 64 is provided and allows thermal energy transfer between the light assembly 42 and the cooling assembly 61. The heat sink may be an integral part of the light source 46 or the light assembly 42. Thermal energy is absorbed by the heat sink 64 from the light assembly 42 and is radiated into the cooling assembly 61.

The thermal sensor 60 is thermally coupled to and senses the temperature of the light source 46 and may be in the form of a thermistor or other temperature-sensing device known in the art. The thermal sensor 60 may be part of the light assembly 42 and be located within the light housing 48, as shown, or may be separate from the light assembly 42 or the housing 48.

The cooling device 62 is in thermal communication with the heat sink 64, via an air sleeve 66. The thermal system 17 circulates air around a perimeter 68 of the heat sink 64 and disperses thermal energy from the heat sink 64 into an air gap 70 between a headliner 72 and a roof 74 of the vehicle 14. The dispersement of the thermal energy cools the heat sink 64 and thus the light assembly 42 and the light source 46. The cooling device 62 is utilized in conjunction with the thermal sensor 60 in controlling temperature of the light source 46, when temperature of the light source 46 is above the minimum temperature limit. The minimum temperature limit refers to a minimum temperature as to when the cooling device 62 may be activated.

Although the cooling device 62 may be in the form of a cooling fan, as shown, the cooling device 62 may be in some other form known in the art. The cooling device 62 may, for example, be in the form of an air-conditioning system or be in the form of a refrigeration type system or circuit having a refrigerant contained therein. As another example, the cooling device 62 may be as simple as an air vent allowing air to circulate and cool the light assembly 42.

The heater 63 may be external to the light source housing 48, as shown, or may be contained within the light source housing 48. The heater 63 is utilized in conjunction with the thermal sensor 60 to control temperature of the light source 46, during cold starts of the vehicle 14 or when temperature of the light source 46 is below the maximum temperature limit. The maximum temperature limit refers to a maximum temperature for operation of the heater 63; the heater 63 may be operated at any temperature less than or equal to the maximum temperature limit. The heater 63 increases temperature of the light source 46 in response to a temperature signal that is generated by the thermal sensor 60.

The controller 50 may be microprocessor based such as a computer having a central processing unit, memory (RAM and/or ROM), and associated input and output buses. The controller 50 may be an application-specific integrated circuit or may be formed of other logic devices known in the art. The controller 50 may be a portion of a central vehicle main control unit, an interactive vehicle dynamics module, a restraints control module, a main safety controller, a control circuit having a power supply, combined into a single integrated controller, or may be a standalone controller as shown.

The heat sink 64 may be of various sizes, types, and styles known in the art. The heat sink 64 includes a thermal coupler layer 80 that covers a forward surface 82 of the heat sink 64. The forward surface 82 resides between the heat sink 64 and the light source 46. The thermal coupler layer 80 provides an efficient thermal transport between the light source 46 and the heat sink 64. The thermal coupler layer 80 may be formed of indium, graphite, or of some other material having similar thermal properties.

By having the thermal system 17 within the illumination system 16, temperature of the light source 46 may be controlled without adjusting temperature of the interior cabin 12.

Figure 4:
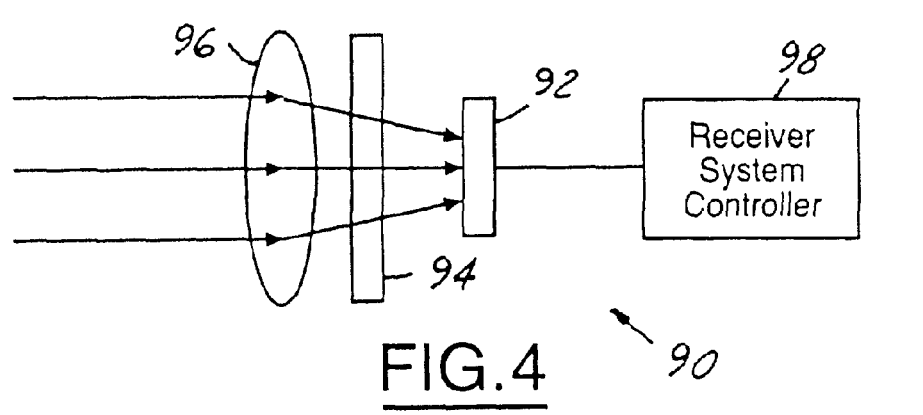
FIG. 4 is a block diagrammatic view of a receiver system in accordance with an embodiment of the present invention.

Referring now to FIG. 4, a block diagrammatic view of the receiver system 18 in accordance with an embodiment of the present invention is shown. The receiver system 18 includes a receiver assembly 90 having a first receiver 92, a filter 94, a lens 96, and a receiver system controller 98.

The receiver 92 may be in the form of a charge-coupled device (CCD) camera or a complementary metal oxide semiconductor (CMOS) camera. A CCD camera, Model No. Wat902HS manufactured from Watec America Corporation of Las Vegas, Nev. may, for example, be used as the receiver 92. Near infrared light reflected off objects is received by the receiver 92 to generate an image signal.

The filter 94 is used to filter the reflected near infrared light. The filter 94 may be an optical bandpass filter that allows light, within a near infrared light spectrum, to be received by the receiver 92. The filter 94 may correspond with wavelengths of light contained within the illumination signal 20. The filter 94 prevents blooming caused by the lights of oncoming vehicles or objects. The filter 94 may be separate from the lens 96 and the receiver 92, as shown, or may be in the form of a coating on the lens 96 or a coating on a lens of the receiver 92, when applicable. The filter 94 may be a digital or analog filter or may be a multistack optical filter located within the receiver 92.

In an embodiment of the present invention, the center wavelength of the filter 94 is approximately equal to an emission wavelength of the light source 46 and the filter full-width-at-half-maximum is minimized to maximize rejection of ambient light. Also, the filter 94 is positioned between the lens 96 and the receiver 92 to prevent the presence of undesirable ghost or false images. When the filter 94 is positioned between the lens 96 and the receiver 92 the light received by the lens 96 is incident upon the filter 94 over a range of angles determined by the lens 96.

The receiver controller 98 may also be microprocessor based, be an application-specific integrated circuit, or be formed of other logic devices known in the art. The receiver controller 98 may be a portion of a central vehicle main control unit, an interactive vehicle dynamics module, a restraints control module, a main safety controller, may be combined into a single integrated controller, such as with the illumination controller 50, or may be a standalone controller as shown.

Referring again to FIGS. 2–4, the main controller 50 controls operation of the light source 46 and the thermal control system 17 whereas the receiver controller 98 controls operation of the receiver 92. The controllers 50 and 98 may be coupled to vision system controls 100, as are shown in FIG. 2, which are mounted on a center console 102. The system controls 100 may include a vision system activation switch 104, a light coupler position adjuster control 106, and an illumination beam brightness control 108.

The vision system 10 may be manually activated through use of the activation switch 104 or the vision system 10 may be internally activated by one of the controllers 50 or 98. The light coupler control 106 may be coupled to a light coupler motor (not shown) and be used to adjust alignment angles of the light coupler 52 relative to the light source 46 and the optic 54. The brightness control 108 may be used to adjust the brightness or clarity of the indication signal on the indicator 26.

The indicator 26 may include a video system, an audio system, an LED, a light, a global positioning system, a heads-up display, a headlight, a taillight, a display system, a telematic system or other indicator known in the art. The indicator 26 may indicate position, range, and traveling speed relative to the vehicle, as well as other known object parameters or characteristics. Objects may include any animate or inanimate objects including pedestrians, vehicles, road signs, lane markers, and other objects known in the art. In one embodiment of the present invention the indicator 26 is in the form of a heads-up display and the indication signal is projected to appear forward of the vehicle 14. The indicator 26 provides a real-time image of the target area to increase the visibility of the objects during relatively low visible light level conditions without having to refocus ones eyes to monitor a display screen within the interior cabin 12.

The vision system operating sensors 28 include a transmission sensor 120, a vehicle speed sensor 122, a headlamp sensor 124, an illumination sensor 126, a vehicle activation sensor 128, and an ambient temperature sensor 130. The sensors 28 may be of various type and style as is known in the art. The transmission sensor 120 detects a current operating gear or mode of a transmission 132. The transmission 132 may be in a forward, neutral, or reverse operating gear or mode. A forward mode refers to a transmission condition that allows the vehicle 14 to travel in a forward direction.

The vehicle speed sensor 122 detects traveling speed of the vehicle 14. The vehicle speed sensor 122 may be in the form of a velocity sensor in which speed and direction of travel is detected.

The headlamp sensor 124 detects operating current of the headlamps 134 (only one is shown). The headlamp sensor 124 may be in the form of a switch to detect whether the headlamps 134 are in an active or ON state. The headlamp sensor 124 may also detect a level of operating current utilized by the headlamps 134, which is further described below.

The illumination sensor 126 detects the amount of light external to the vehicle 14. The illumination sensor 126 may be utilized to determine whether the vehicle 14 is being operated during daylight hours. The illumination sensor 126 may be in the form of a sun-load sensor, a photosensor, or other illumination sensor known in the art. The vehicle activation sensor 128 detects whether the vehicle 14 has been activated.

The vehicle activation sensor 128 may be in the form of an ignition switch or sensor, a vehicle power switch or sensor, or other vehicle activation sensor known in the art. The ambient temperature sensor 130 may be mounted proximate to the light source 46 and detect the temperature of the air or operating environment of the light source 46.

The vision system 10 may also include a transmitter 140 and a second receiver 142. The transmitter 140 and the receiver 142 may be in the form of radio frequency devices or infrared devices or may be in some other form of transmitter and receiver devices known in the art. The receiver 142 is coupled to the controller 50. The transmitter 140 and the receiver 142 may be used to precondition the vehicle 14 or components and systems contained therein. For example, the transmitter 140 may signal the controller 50, via the receiver 142, as to preheat the interior cabin 12 or to initiate activation of the vision system 10. In activating the vision system 10, the controller 50 may preheat the light source 46 or the heat sink 64. Although the transmitter 140 is shown as a keyfob the transmitter 140 may be in the form of a cellular phone, an active transmitter, a passive transmitter, or may be in some other form known in the art. The second receiver 142 may be part of the first receiver 92.

Figure 5A:
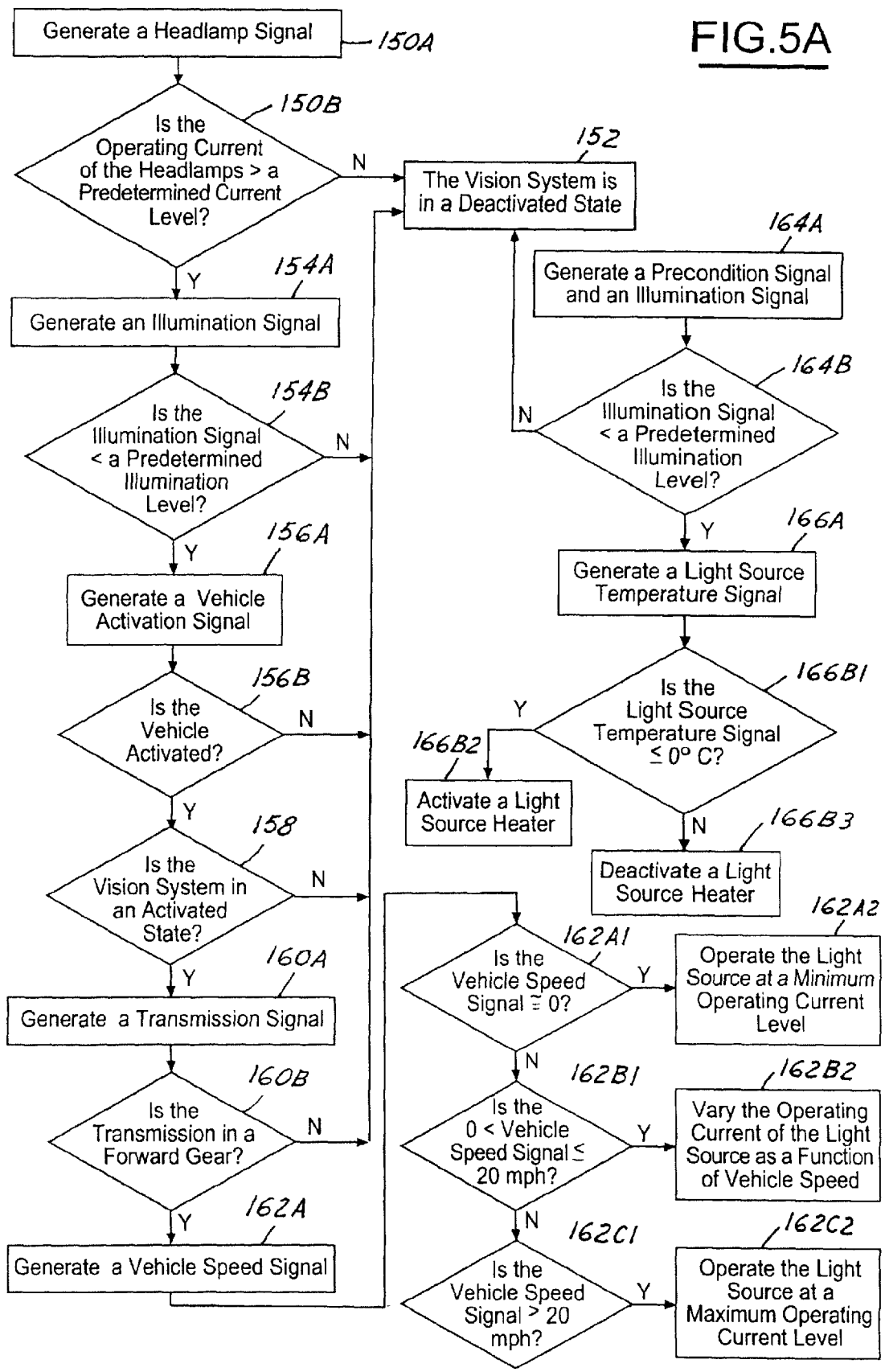
FIG. 5A is a logic flow diagram illustrating a method of controlling the active night vision system in accordance with an embodiment of the present invention; and, FIG. 5B is a logic flow diagram illustrating a method of thermally controlling the operating range of a light source of the active night vision system in accordance with an embodiment of the present invention.

Referring now to FIG. 5A, a logic flow diagram illustrating a method of controlling the vision system 10 in accordance with an embodiment of the present invention is shown.

In step 150A, the headlamp sensor 124 generates a headlamp signal that signifies the operating current of the headlamps 134. In an embodiment of the present invention, the headlamp signal signifies actual operating current level of each of the headlamps 134. By acquiring the operating current level of the headlamps 134, the controller 50 is able to determine whether at least one of the headlamps 134 is actually in an active state and is providing illumination to an area forward of the vehicle 14, such as area 24.

In the following steps 150–162 the controller 50 enables and disables the activation of the vision system 10 in response to the headlamp signal, the illumination signal, the vehicle activation signal, the vehicle state, the transmission signal, and the vehicle speed signal.

In step 150B, the controller 50, in response to the headlamp signal, determines whether the operating current is below a predetermined current level. When the operating current is greater than the predetermined current level, the controller 50 proceeds to step 152, otherwise the controller 50 proceeds to step 154A.

In step 152, the vision system 10 is in a deactivated state. The illumination system 16 is deactivated. The controller 50 either deactivates the illumination system 16 or prevents the illumination system 16 from being activated.

In step 154A, the illumination sensor 126 generates an illumination signal. In step 154B, the controller 50, in response to the illumination signal, determines whether the vehicle 14 is operating during daylight hours. In so doing, the controller 50 assures that the vision system 10 is not being operated at nighttime or during times when the amount of day light is less than a predetermined level, without the use of headlamps 134. This assurance is provided even though the vision system 10 is capable of providing a vehicle operator with sufficient visibility and environmental awareness for such use. When the illumination signal is less than a predetermined illumination level the controller 50 proceeds to step 156A, otherwise the controller 50 proceeds to step 152.

In step 156A, the activation sensor 128 generates a vehicle activation signal or signifies whether the vehicle 14 has been activated. In step 156B, when the vehicle 14 has been activated the controller 50 proceeds to step 158, otherwise the controller 50 proceeds to step 152.

In step 158, the controller 50 determines whether the activation switch 104 is in an ON state or has been actuated as to enable an activation state of the vision system 10. When the activation switch 104 has indicated that the vision system 10 has been activated the controller 50 proceeds to step 160A, otherwise the controller 50 proceeds to step 152.

In step 160A, the transmission sensor 120 generates a transmission signal. In step 160B, when the transmission 132 is in a forward gear and the vision system 10 is being utilized for viewing an area forward of the vehicle 14 the controller 50 proceeds to step 162A, otherwise the controller 50 proceeds to step 152. Thus, the controller 50 assures that the vehicle 14 is traveling in a forward direction before activation of the vision system 10. When the vision system 10 is being used for viewing other areas external to the vehicle 14 the controller 50 may permit activation of the vision system 10 when the transmission 132 is in gears or modes other than a forward gear or mode.

In step 162, the vehicle speed sensor 122 generates a vehicle speed signal. The controller 50 enables the illumination system 16 and the receiver system 18 in response to the vehicle speed signal. The controller 50 in response to the vehicle speed signal determines and varies operation of the light source. When the vision system 10 is activated the controller 50 simultaneously performs steps 180–182D of FIG. 5B.

In steps 162A1–2, when the vehicle speed signal is approximately equal to zero the light source 46 is operated at a minimum current level $1_{min}$. In steps 162B1–2, when the vehicle speed signal is approximately between zero and 20 mph or equal to approximately 20 mph the controller 50 gradually increases the operating current of the light source 46 with respect to the increase in vehicle speed. The operating current, for vehicle speeds between zero and 20 mph, is determined as a function of the vehicle speed. Minimum and maximum levels of the function correspond to the minimum current level $1_{min}$ and a maximum current level $1_{max}$. In steps 162C1–2, when the vehicle speed is approximately greater than 20 mph the operating current of the light source 46 is approximately equal to the maximum current level $1_{max}$.

In step 164A, the transmitter 140 generates a precondition signal and the illumination sensor 126 generates the illumination signal. In step 164B, the controller 50 in response to the precondition signal and the illumination signal determines whether to activate the vision system 10 and preheat the light source 46 or the heat sink 64. When the controller 50 receives the precondition signal and determines that the illumination signal is below the predetermined illumination level, the controller 50 proceeds to step 166A, otherwise the controller 50 proceeds to step 152.

In step 166A, the thermal sensor 60 generates a light source temperature signal in response to the temperature of the light source 46 or the heat sink 64. In steps 166B1–3, when the temperature signal is less than or approximately equal to 0° C. the controller 50 activates the heater 63 to increase the temperature of the light source 46 or the heat sink 64. When the temperature signal is greater than approximately 0° C. the controller 50 deactivates the heater 63.

In step 180, the thermal sensor 60 generates the light source temperature signal in response to the temperature of the light source 46.

Figure 5B:
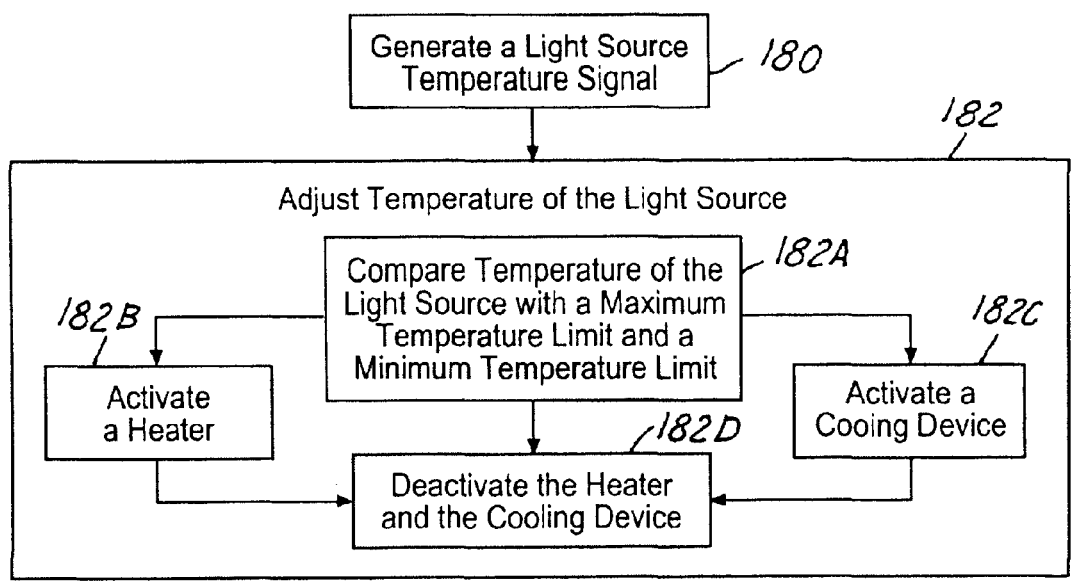

Referring now to FIG. 5B, a logic flow diagram illustrating a method of thermally controlling the operating range of the light source 46 in accordance with an embodiment of the present invention is shown.

In step 182, the controller 50 adjusts temperature of the light source 46 or the heat sink 64 in response to the light source temperature signal.

In step 182A, the controller 50 compares temperature of the light source 46 or the heat sink 64 with the maximum temperature limit and the minimum temperature limit.

In step 182B, when the temperature of the light source 46 is less than or equal to the maximum temperature limit, the controller 50 activates the heater 63 to increase the temperature of the light source 46. The maximum temperature limit, using the above sample temperature range of 35°–55° C., may be approximately equal to a temperature range between 35°–42° C. The temperature range between 35°–42° C. may be referred to as a heater deactivation zone. The heater 63 may be activated to increase temperature of the light source 46 even when the vision system 10 is deactivated. By warming the light source 46 before activation of the vision system 10, the light source 46 is ready for operation when the vision system 10 is activated, without time delay for ramping up temperature of the light source 46.

In step 182C, when the temperature of the light source 46 is greater than or equal to the minimum temperature limit the controller 50 activates the cooling device 62 to draw thermal energy out and away from the light source 46, in effect cooling the light source 46. For example, the light source 46 may have an operating temperature range of approximately between 35°–55° C. A minimum temperature limit may refer to a temperature in a portion of that temperature range, approximately between 52°–55° C., depending upon thermal response time of the system 10. The temperature range between 52°–55° C. may be referred to as a cooling device activation zone.

In step 182D, when the temperature of the light source 46 is between the maximum temperature limit and the minimum temperature limit the controller 50 deactivates the heater 63 and the cooling device 62.

When the temperature of the light source 46 is greater than or equal to an upper end of the heater deactivation zone the heater 63 is deactivated. For example, the heater deactivation zone may be approximately equal to 35°–42° C., wherein the heater 63 may be deactivated; the upper end may be approximately equal to 42° C.

When the temperature of the light source 46 is less than or equal to a lower end of the cooling device activation zone the cooling device 62 is deactivated. For example, the cooling device activation zone may be approximately equal to 52°–55° C., wherein the cooling device 62 may be activated; the lower end may be approximately equal to 52° C.

The above-stated temperatures and temperature ranges, are provided simply for example purposes only and may be adjusted depending upon the application. For example, in another embodiment of the present invention the light source 46 is maintained within an approximate temperature operating range of 35°–55° C.

The present invention by maintaining temperature-operating range of the light source maintains wavelength-operating range of the light source, thus maximizing light passage through the filter 94. By maintaining the wavelength operating range of the light source 46, the present invention minimizes deviations from a filter center wavelength, which can result in reduction of light passing through the filter 94.

The controller 50 in determining operating speeds of the cooling device 62 and thermal output of the heater 63 may use one or more look-up tables containing associated values corresponding to the possible light source temperatures.

The controller 50 may ramp up or down rotational speed or thermal output of the cooling device 62 and the heater 63, respectively, upon activation or deactivation thereof. The controller 50 may operate the cooling device 62 and the heater 63 at incremental speeds and thermal outputs or may gradually vary speed and thermal output thereof in response to changes in temperature of the light source 46.

The controller 50, in order to provide increased service life of the cooling device 62, may also adjust the cycle time of the cooling device 62. For example, the cooling device 62 may provide an equivalent amount of cooling by operating the cooling device 62 at a lower speed and for a longer duration as opposed to operating the cooling device 62 at a higher speed and for a shorter duration. In so doing, the present invention minimizes cycle time, or the number of times the cooling device 62 is activated and deactivated within a given period of time.

The controller 50 may determine in certain instances to activate the cooling device 62 or the heater 63 at a maximum speed or maximum thermal output, respectively, in order to provide a maximum amount of cooling or heating. For example, when temperature of the light source 46 increases quickly over a short duration of time the controller 50 may activate the cooling device 62 at a maximum speed to rapidly cool the light source 46. The controller 50 may deactivate the light source 46 when the thermal control system 17 is operating inappropriately to protect the light source 46. When the light source 46 is deactivated the controller 50 may signal a vehicle operator in the form of an alarm signal, via the indicator 26.

The above-described steps are meant to be illustrative examples; the steps may be performed sequentially, synchronously, simultaneously, or in a different order depending upon the application.

The present invention provides a vision system that is capable of controlling activation and operation of a light source in response to various vehicle and vision system parameters, such as those acquired from sensors 28. In so doing, the present invention is capable of satisfying various operating standards. The present invention is also capable of maintaining a desired wavelength operating range of the light source through accurate temperature control of the light source.

While the invention has been described in connection with one or more embodiments, it is to be understood that the specific mechanisms and techniques which have been described are merely illustrative of the principles of the invention, numerous modifications may be made to the method and apparatus described without departing from the spirit and scope of the invention as defined by the appended claims.

What is claimed is:

1. A vision system for a vehicle comprising:
   a light source generating an illumination beam;
   a first receiver generating an image signal in response to at least a reflected portion of said illumination beam;
   a transmission sensor generating a transmission signal; and
   a controller coupled to said light source, said first receiver, and said transmission sensor and enabling activation of said light source when said transmission signal signifies that a transmission of the vehicle is in a forward mode.

2. A system as in claim 1 wherein said controller enables activation of said first receiver when said transmission signal signifies that said transmission is in said forward mode.

3. A system as in claim 1 wherein said controller disables activation of said light source when said transmission signal signifies that a transmission of the vehicle is in a mode selected from a reverse mode, a neutral mode, and a park mode.

4. A system as in claim 1 further comprising a vehicle speed sensor generating a vehicle speed signal, said controller enabling said light source in response to said vehicle speed signal.

5. A system as in claim 4 wherein said controller operates said light source at a minimum current level when said vehicle speed sign is approximately equal to zero.

6. A system as in claim 4 wherein said controller increases operating current of said light source as said vehicle speed signal increases from approximately zero to approximately 20 mph.

7. A system as in claim 4 wherein said controller operates said light source at a maximum current level when said vehicle speed signal is greater than approximately 20 mph.

8. A system as in claim 1 further comprising a headlamp sensor generating a headlamp signal, said controller enabling activation of said light source in response to said headlamp signal.

9. A system as in claim 8 wherein said headlamp sensor in generating said headlamp signal detects operating current of at least one headlamp of the vehicle.

10. A system as in claim 1 further comprising an exterior illumination sensor sensing illumination levels exterior to the vehicle and generating an exterior illumination signal, said controller enabling activation of said light source in response to said exterior illumination signal.

11. A system as in claim 10 wherein said controller enables activation of said light source when the illumination signal is below a predetermined level.

12. A system as in claim 1 further comprising:
    a thermal sensor coupled to said light source and generating a first temperature signal; and
    a thermal heater coupled to at least a portion of said light source;
    said controller coupled to said thermal sensor and said thermal heater, maintaining temperature of at least a portion of said light source, and enabling activation of said light source in response to said first temperature signal.

13. A system as in claim 12 further comprising an ambient sensor generating a second temperature signal, said controller coupled to said ambient sensor and adjusting output of said thermal heater in response to said second temperature signal.

14. A system as in claim 12 further comprising a heat sink coupled to said light source, said controller maintaining temperature of at least a portion of said heat sink in response to said first temperature signal.

15. A system as in claim 1 further comprising a thermal heater coupled to said light source, said controller coupled to said thermal heater and preheating at least a portion of said light source before enabling activation of said light source.

16. A system as in claim 1 further comprising a thermal heater coupled to said light source, said controller coupled to said thermal heater and preheating at least a portion of said light source before enabling activation of an ignition system of the vehicle.

17. A system as in claim 1 further comprising:
    a transmitter generating an activation signal; and
    a second receiver receiving said activation signal;
    said controller coupled to said second receiver and enabling activation of said light source in response to said activation signal.

18. A system as in claim 17 wherein said transmitter is a transmitter selected from at least one of a cellular phone, a keyfob, an active transmitter, and a passive transmitter.

19. A vision system for a vehicle comprising:
- a light source generating an illumination beam;
- a receiver generating an image signal in response to at least a reflected portion of said illumination beam;
- a transmission sensor generating a transmission signal;
- a vehicle speed sensor generating a vehicle speed signal;
- a headlamp sensor generating a headlamp signal;
- an exterior illumination sensor sensing illumination levels exterior to the vehicle and generating an exterior illumination signal; and
- a controller coupled to said light source, said receiver, said transmission sensor, said vehicle speed sensor, said headlamp sensor, and said exterior illumination sensor and enabling activation of said light source and said receiver in response to said transmission signal, said vehicle speed signal said headlamp signal, and said exterior illumination signal.

20. A method of operating a vision system of a vehicle comprising:
- generating an illumination beam;
- generating an image signal in response to at least a reflected portion of said illumination beam;
- generating a transmission signal;
- enabling activation of said light source in response to said transmission signal; and
- disabling activation of said light source when said transmission signal signifies that a transmission of the vehicle is in a mode selected from a reverse mode, a neutral mode, and a park mode.

* * * * *